United States Patent
Madduri

(10) Patent No.: US 7,305,542 B2
(45) Date of Patent: Dec. 4, 2007

(54) INSTRUCTION LENGTH DECODER

(75) Inventor: Venkateswara Rao Madduri, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 254 days.

(21) Appl. No.: 10/180,389

(22) Filed: Jun. 25, 2002

(65) Prior Publication Data

US 2003/0236964 A1    Dec. 25, 2003

(51) Int. Cl.
G06F 9/30      (2006.01)
G06F 9/40      (2006.01)
G06F 15/00     (2006.01)

(52) U.S. Cl. ................. 712/204; 712/210; 712/24; 712/212; 712/213

(58) Field of Classification Search ................ 712/210, 712/24, 212, 213, 204
See application file for complete search history.

(56) References Cited

U.S. PATENT DOCUMENTS

| | | | | |
|---|---|---|---|---|
| 5,535,347 A | * | 7/1996 | Grochowski et al. | 712/204 |
| 5,537,629 A | * | 7/1996 | Brown et al. | 712/210 |
| 6,237,074 B1 | * | 5/2001 | Phillips et al. | 711/213 |
| 6,260,134 B1 | * | 7/2001 | Zuraski et al. | 712/210 |
| 6,405,303 B1 | * | 6/2002 | Miller et al. | 712/210 |

* cited by examiner

*Primary Examiner*—Alford Kindred
*Assistant Examiner*—Jesse R Moll
(74) *Attorney, Agent, or Firm*—Caven & Aghevli LLC

(57) ABSTRACT

Speculatively decoding instruction lengths in order to increase instruction throughput. Instructions are speculatively decoded within a pipelined microprocessor architecture such that up to four instruction lengths may be decoded within a maximum of two processor clock cycles.

21 Claims, 5 Drawing Sheets

| Prefix 0 - 14 bytes 101 | Opcode 1 - 2 bytes 105 | MOD/RM 0 - 1 byte 110 | SIB 0 - 1 byte 115 | Displacement 0 - 6 bytes 120 | Immediate 0 - 4 bytes 125 |

FIG. 1
(PRIOR ART)

INSTRUCTION LENGTH DECODER

FIELD

Embodiments of the invention relate to the field of instruction length decoding within a computer system. More particularly, embodiments of the invention relate to improving microprocessor and computer system performance by speculatively decoding instruction lengths in a parallel fashion without incurring a significant increase in cost.

BACKGROUND

In pipelined microprocessor architectures, such as a complex instruction-set computing (CISC) architecture, instructions may vary in length. Furthermore, instructions may be stored in an unaligned manner before being decoded and executed. Therefore, the length of the instructions may first need to be determined in order to properly align the instructions for execution.

FIG. 1 illustrates a typical instruction format of an instruction, such as one associated with an Intel® x86 processor architecture of Intel Corporation of Santa Clara, Calif. The instruction illustrated in FIG. 1 includes a prefix 101, an opcode 105, a MOD/RM field 110, a SIB field 115, a displacement field 120, and an immediate field 125.

The prefix appears before the opcode and may override various default attributes associated with the opcode. For example, a prefix may override the default size of the operand, the default size of the address specifier, and/or the default segment. Furthermore, the prefix may indicate a string instruction loop and/or indicate a bus lock cycle while executing an instruction. Prefixes that effect the length decoding of instruction include the overriding address size prefix, the overriding operand size prefix, and the repeat prefix.

The operand size override prefix may alter the default size of an operand associated with an instruction. For example, a 16-bit instruction containing the operand size override prefix may contain a 32-bit operand instead of the default 16-bit operand. Conversely, a 32-bit instruction containing the operand size override prefix may contain a 16-bit operand instead of the default 32-bit operand.

The address size override prefix may alter the default size of the address associated with the instruction. For example, a 16-bit instruction containing the address size override prefix may contain a 32-bit address instead of the default 16-bit address. Conversely, a 32-bit instruction containing the address size override prefix may contain a 16-bit address instead of the default 32-bit address.

The opcode identifies the operation to be performed by the instruction. Furthermore, the opcode may specify the number of immediate bytes, presence of the MOD/RM field, and/or displacement bytes. For example, an opcode may specify up to 6 displacement bytes or up to 4 immediate bytes.

The MOD/RM byte indicates the type of source and/or destination operands that are to be used in conjunction with an instruction. For example, the MOD/RM byte may indicate the existence within the instruction of up to four displacement bytes or a scale index (SIB) byte.

The SIB byte indicates other complex addressing modes. For example, the SIB byte may specify up to four displacement bytes.

Because each instruction may vary in length according to the above fields, it is necessary first determined the length of the instruction before it can be decoded and subsequently executed by a processor. Typical instruction length decoders are able to length decode only one instruction per processor clock cycle.

BRIEF DESCRIPTION OF THE DRAWINGS

Embodiments and the invention are illustrated by way of example and not limitation in the figures of the accompanying drawings, in which like references indicate similar elements and in which:

FIG. 1 is illustrates an x86 instruction format.

DETAILED DESCRIPTION

Embodiments of the invention described herein pertain to computer instruction decoding. More particularly, embodiments of the invention relate to speculatively decoding instructions within a pipelined microprocessor architecture in order to increase instruction throughput and processor and computer system performance.

Pipelined microprocessor performance is dependent, at least to some extent, upon the efficiency with which instructions can be decoded and subsequently executed. In order to improve instruction-decoding throughput within a pipelined microprocessor, the rate at which instruction length is decoded may be increased.

This is especially true for complex instructions, such as Intel x86 instructions. Because complex instructions can vary in size, improving the rate at which instruction length decoding is done can have significant effects on overall instruction decoding performance and resulting processor performance.

At least one embodiment of the invention helps improve instruction-decoding performance by speculatively decoding the length of instructions in a parallel manner. Particularly, one embodiment of the invention enables up to four instructions to be speculatively decoded in two processor clock cycles. Furthermore, the embodiment improves instruction length decoding throughput without incurring significant cost or power.

Figure 2:
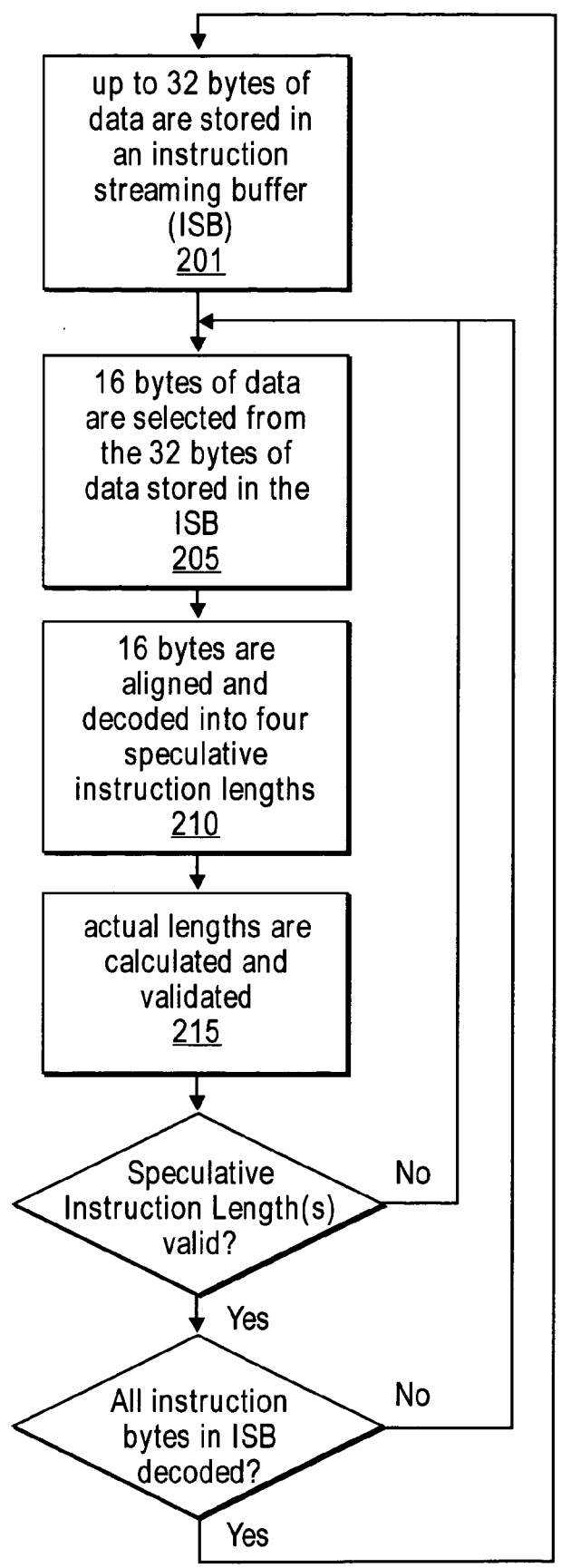
FIG. 2 is a flow diagram illustrating stages of a fetch pipeline according to one embodiment of the invention.

FIG. 2 is a flow diagram illustrating stages of a fetch pipeline according to one embodiment of the invention. Referring to FIG. 2, up to 32 bytes of data are stored 201 in an instruction-streaming buffer (ISB). Next, 16 bytes of data are selected from the 32 bytes of data stored in the ISB 205. The 16 bytes are then aligned and decoded into four speculative instruction lengths 210 before the actual lengths are finally calculated and validated 215. Depending upon the results of the speculative decoding, another 16 bytes of data of the 32 bytes stored in the ISB may be selected for speculative length decoding. Once all instructions within the 32 bytes have been decoded into their respective lengths, another 32 bytes of data may be loaded into the ISB and the process begins again.

Figure 3:
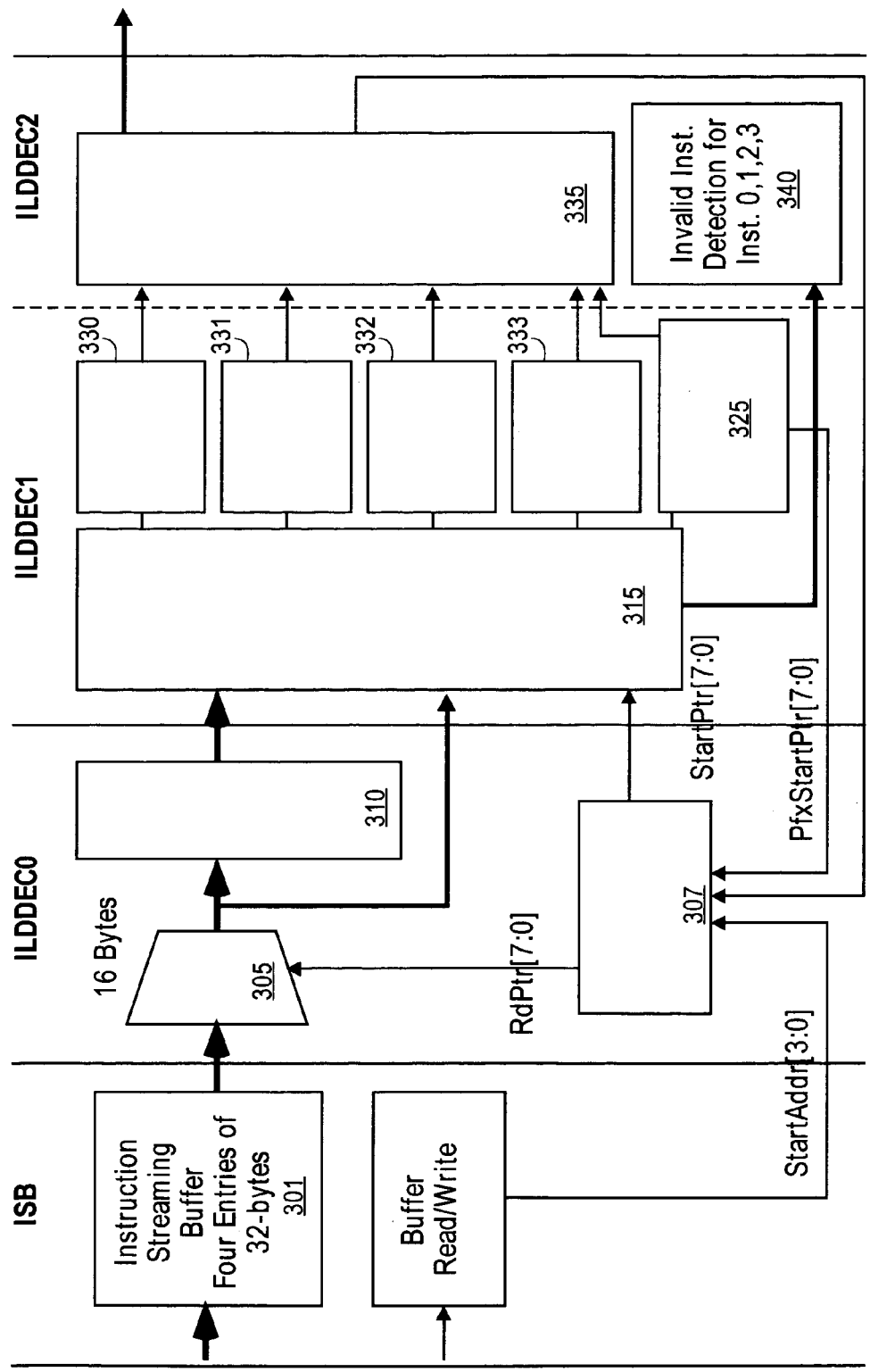
FIG. 3 is a block diagram illustrating an instruction decoder according to one embodiment of the invention.

FIG. 3 illustrates an instruction decoder according to one embodiment of the invention. Referring to FIG. 3, an ISB 301 contains up to 32 bytes of data from which 16 bytes of data may be selected by a mux 305 and selection logic 307.

Starting from the first byte of the 16 bytes, prefix decode logic 310 decodes any prefix information until an opcode is encountered. If prefix information is decoded, it is forwarded to shift logic to prefix control and accumulation logic 315 which will assist in calculating and validating instruction lengths speculatively decoded in the length decode stage of by the instruction decoder. The remainder of the 16 bytes of data are then forwarded to shift logic 325 to align the remainder to the first opcode. The remainder of the 16 bytes of data are then speculatively decoded into four-byte instruction lengths in parallel by four speculative instruction length decoders 330-333. The speculatively decoded instructions are then forwarded to length calculation and validation logic 335 where, along with the prefix control information, the actual instruction lengths of any instructions within the original 16 bytes of data are calculated, thereby validating or invalidating the speculative length decoding. If the speculative length decoding is correct and therefore validated, the next 16 bytes of data from the original 32 bytes in the ISB are selected and the process repeats.

If, however, the speculative length decoding was not correct and therefore invalidated, the next 16 bytes of the original 32 bytes in the ISB may then be selected to complete the length decoding of the first 16 bytes of data. The determination of how to proceed after the speculative length decoding is complete depends upon the speculative instruction decoder results.

In particular, the speculative instruction length decoders each decode four bytes of the remainder of 16 bytes after prefixes have been removed. The first speculative length decoder starts at the first opcode within the remainder of the 16 bytes and speculatively decodes the first four bytes as one instruction. The other three speculative length decoders also speculatively decode four bytes, but each starts at the next byte from the previous four bytes in the remainder of the 16 bytes. Four bytes are speculatively decoded in one embodiment, because typical x86 instruction length is 2-3 bytes. Furthermore, four speculative decoders are used in order to optimize power and cost given that the typical x86 instruction is 2-3 bytes long.

If the four-byte instruction speculatively decoded by instruction length decoder 330 is actually less than four bytes, as determined by the length calculation and validation logic based on the prefix information provided by the prefix control and accumulation logic, one of the other three instruction length decoders will have decoded the next instruction starting where the first instruction left off. For example, if the instruction decoded by instruction length decoder 330 is actually only 2 bytes, instruction length decoder 331 will have had started decoding at the next instruction. Depending upon the actual length of the instruction decoded by instruction length decoder 331, either or both of instruction length decoders 332 and 333 will decode the third and fourth instructions.

If, however, the instruction speculatively decoded by instruction length decoder 330 is actually longer than 4 bytes, then instruction length decoder 332 or 333 may decode the next instruction, depending on how long the first instruction is. Prefix information existing between each instruction is decoded by the shift logic prior to the instructions being decoded by the speculative instruction decoders, so the speculative decoders operate on the instruction data, which may include opcode information, MOD/RM information, and/or SIB information.

The actual length of the speculatively decoded instructions are calculated based upon the prefix information, MOD/RM information, and/or SIB information within each instruction. An invalid instruction detection corresponding to any of the speculative instruction length decoders is detected and indicated by the invalid instruction detection logic 340.

Because x86 instructions are typically no more than 15 bytes, the embodiment described above is able to decode at least one instruction length in the worst case, which is equivalent to prior art instruction length decoding performance.

The embodiment illustrated in FIG. 3 is not limited to the exact structure or implementation shown therein. For example, other embodiments may operate on greater or smaller streams of data. Therefore, the ISB may store more than 32 bytes or less than 32-bytes and the number of bytes selected may be greater or less than 16 bytes, depending upon the needs of a particular instruction and/or processor architecture. Accordingly, there may be fewer or greater speculative instruction length decoders than those illustrated in FIG. 3, depending upon the instruction size and the cost/power requirements of the processor in which it is implemented.

Furthermore, other embodiments of the invention may be implemented in a different number of stages or different functional units than illustrated in FIG. 3. For example, in one embodiment, the decoders may be integrated with the shift logic or other functional units within the instruction decoder. Instead of using hardware logic, such as logic composed of complimentary metal-oxide semiconductor (CMOS) circuits, the at least one embodiment uses instructions stored within a machine-readable medium (software) to implement some or all of the functional units necessary to carry out embodiments of the invention.

Figure 4:
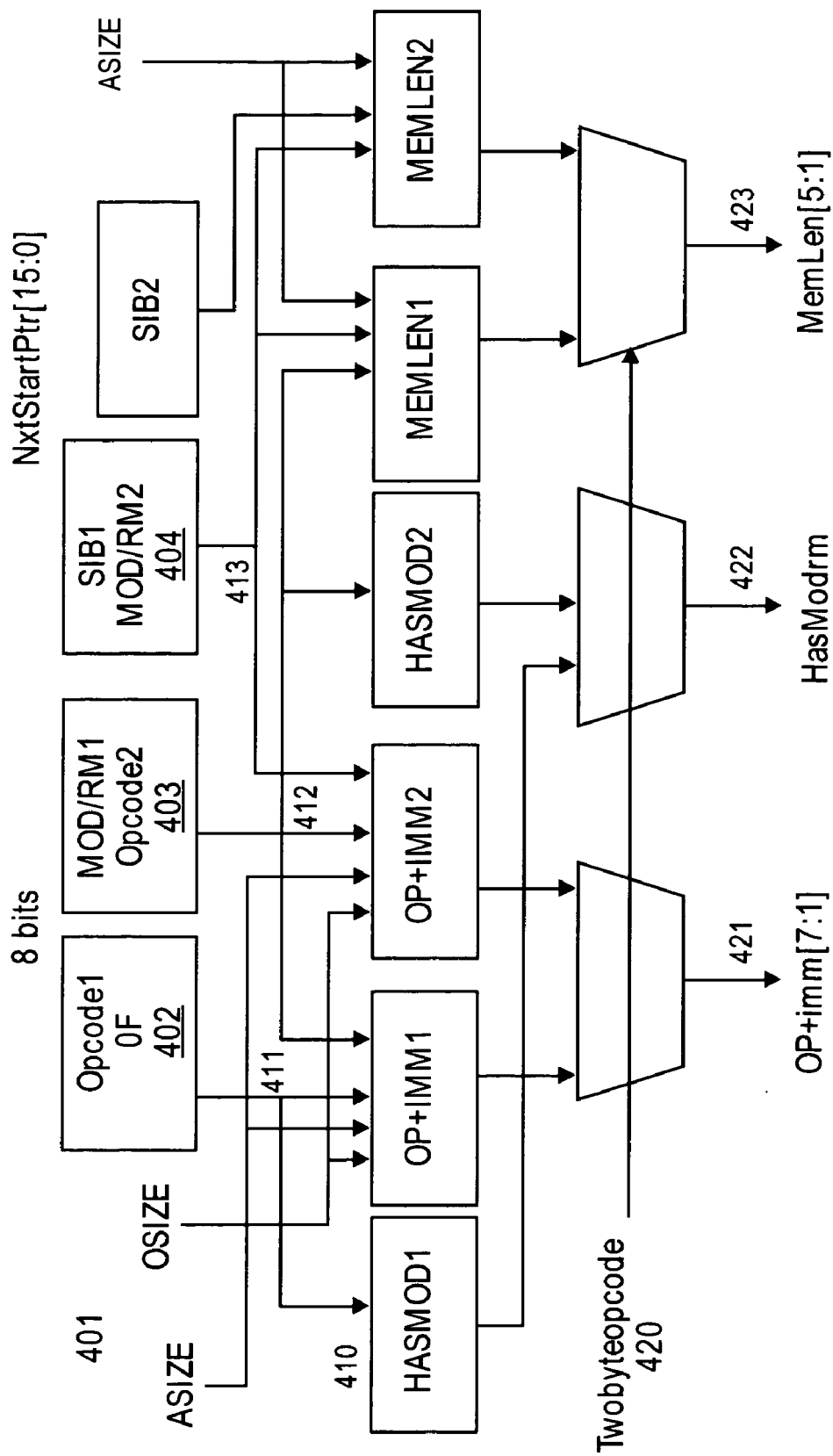
FIG. 4 is a block diagram illustrating an instruction length decoder according to one embodiment of the invention.

FIG. 4 illustrates a speculative instruction length decoder according to one embodiment of the invention. The instruction length decoder of FIG. 4 is composed of various functional units to speculatively determine the size of an instruction according to the information stored within the instruction. Referring to FIG. 4, the instruction decoder attempts to determine whether the instruction is a 2-byte opcode or a 1-byte opcode and what MOD/RM and SIB bytes exist within the instruction by passing the instruction through the first decoding layer 401. Particularly, the opcode1 decoder 402 decodes the instruction opcode as though it were a one-byte opcode while the MOD/RM 403 and SIB 404 decoder treat the following bytes as MOD/RM and SIB bytes, respectively. It is determined in the next layer 410 whether the assumption in the first layer was correct by further decoding the opcode 411, MOD/RM 412, and SIB 413 bytes to see if there is a second opcode. Depending upon whether there is a two-byte opcode, the third layer 420 will select the appropriate signals from the mux's 421, 422, 423.

The outputs of the decoder indicate the opcode and immediate (if any) 430, whether there is a MOD/RM field 431, and the memory length necessary to store the instruction 432. The memory length is determined by the size of the opcode, the MOD/RM field, and the SIB field.

The exact implementation of the speculative instruction decoders may vary in other embodiments. For example, some of the functional units illustrated in FIG. 4 may be integrated with other functional units. Furthermore, some or all of the functional units illustrated if FIG. 4 may be implemented in software, instead of hardware, such as CMOS circuits.

Figure 5:
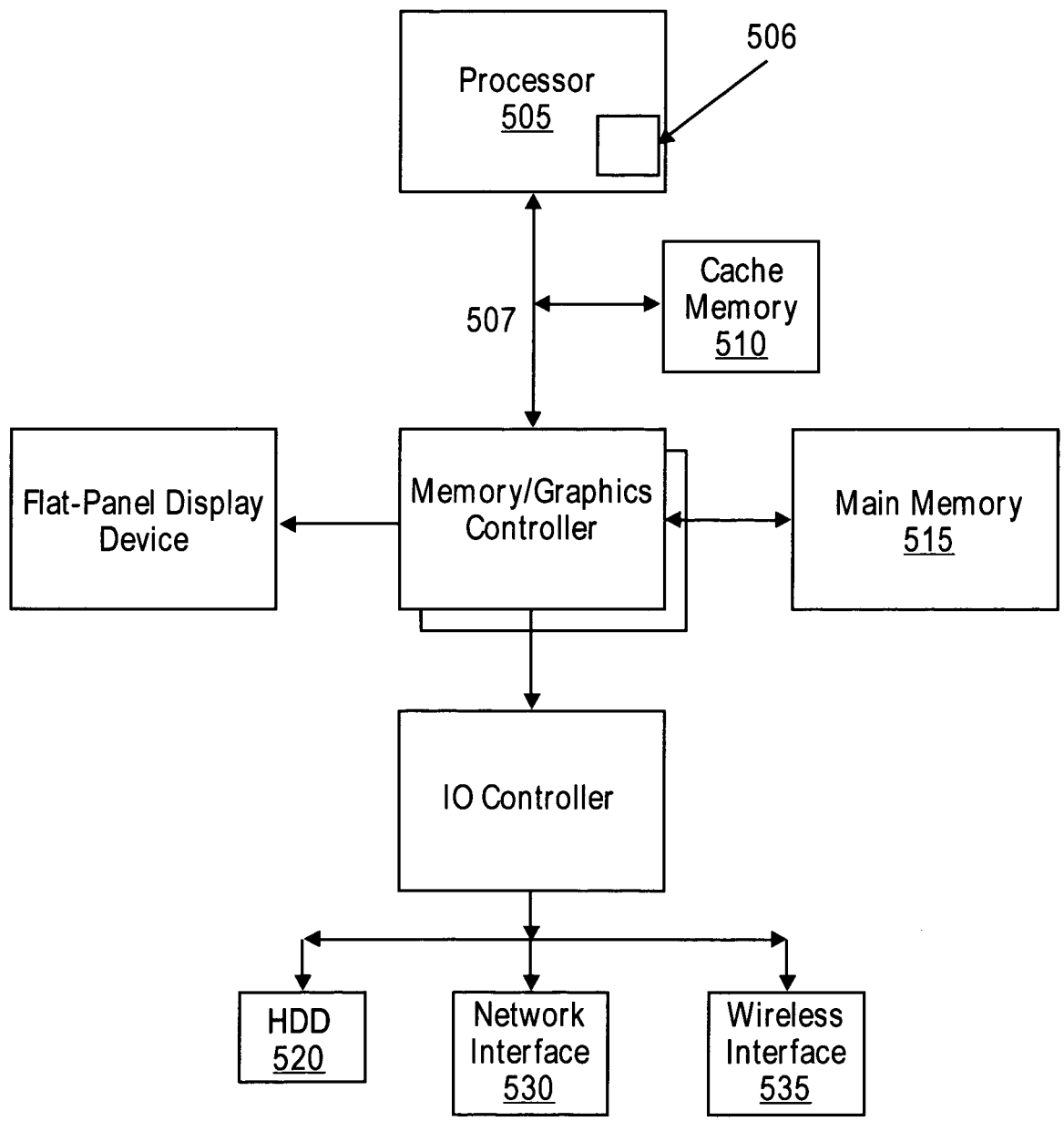
FIG. 5 illustrates a computer system in which at least one embodiment of the invention may be used.

FIG. 5 illustrates a computer system that may be used in conjunction with one embodiment of the invention. A processor 505 accesses data from a cache memory 510 and main memory 515. Illustrated within the processor of FIG. 5 is the location of one embodiment of the invention 506. However, embodiments of the invention may be implemented within other devices within the system, as a separate bus agent, or distributed throughout the system. The main memory may be dynamic random-access memory (DRAM), a hard disk drive (HDD) 520, or a memory source 530 located remotely from the computer system containing various storage devices and technologies. The cache memory may be located either within the processor or in close proximity to the processor, such as on the processor's local bus 507. Furthermore, the cache memory may be composed of relatively fast memory cells, such as six-transistor (6T) cells, or other memory cells of approximately equal or faster access speed.

In the foregoing specification the invention has been described with reference to specific exemplary embodiments. It will, however, be evident that various modifications and changes may be made thereto without departing from the broader spirit and scope of the invention. The specification and drawings are, accordingly, to be regarded in an illustration rather than a restrictive sense.

What is claimed is:

1. A machine-readable medium having stored thereon a set of instructions, which when executed by a machine cause said machine to perform a method comprising:
    selecting a first plurality of instruction bytes from an instruction-streaming buffer (ISB);
    aligning a subset of said first plurality of instruction bytes to a first opcode;
    decoding a plurality of speculative lengths of a plurality of instructions within said subset in parallel;
    calculating a plurality of actual lengths of said plurality of instructions within said subset;
    generating a signal to cause invalidation of an instruction if any of said plurality of speculative lengths do not correspond with said plurality of actual lengths of said plurality of instructions within said subset.

2. The machine-readable medium of claim 1 further comprising decoding a prefix within said first plurality of instruction bytes, said prefix to be used to calculate said plurality of actual lengths.

3. The machine-readable medium of claim 2 wherein said prefix is an operand size override prefix.

4. The machine-readable medium of claim 2 wherein said prefix is an address size override prefix.

5. The machine-readable medium of claim 2 wherein said decoding comprises decoding said subset into four groups of instruction bytes of four bytes each.

6. The machine-readable medium of claim 5 wherein each of said four groups of instruction bytes comprises three instruction bytes of another group of said four groups.

7. The machine-readable medium of claim 2 further comprising selecting a second plurality of instruction bytes after said actual lengths of said plurality of instruction have been calculated.

8. The machine-readable medium of claim 7 wherein said plurality of lengths of said plurality of instructions comprises four bytes.

9. A method comprising:
    selecting a first plurality of instruction bytes from an instruction-streaming buffer (ISB);
    speculatively decoding a plurality of instruction lengths corresponding the to the first plurality of instruction bytes in parallel;
    determining whether said plurality of instruction lengths are decoded;
    generating a signal to cause invalidation of an instruction if it is not properly decoded;
    selecting a second plurality of instruction bytes from the first plurality of instruction bytes, wherein said selecting depends upon whether a speculatively decoded instruction lengths is valid.

10. The method of claim 9 further comprising calculating a plurality of actual instruction lengths.

11. The method of claim 10 further comprising decoding a prefix to assist in determining said actual instruction lengths.

12. The method of claim 9 wherein a maximum of four instructions are decoded within two processor clock cycles.

13. The method of claim 11 wherein said second plurality of instruction bytes is to be speculatively decoded into said plurality of instruction lengths.

14. The method of claim 13 wherein said plurality of instruction lengths correspond to instructions within an x86 instruction set.

15. An apparatus comprising:
    a means for storing instruction bytes in an instruction-streaming buffer (ISB);
    a means for selecting a subset of said instruction bytes comprising a means for decoding a prefix within said instruction bytes;
    a means for speculatively decoding an instruction length of an instruction within said subset of instruction bytes comprising a means for aligning an instruction;
    a means for calculating an actual instruction length of said instruction based at least partially upon said prefix;
    a means for selecting said subset of instruction bytes based upon validity of a speculatively decoded instruction length.

16. The apparatus of claim 15 further comprising means for speculatively decoding a plurality of instruction lengths of a plurality of instructions in parallel.

17. The apparatus of claim 15 further comprising means for accumulating said prefix and providing information contained within said prefix to said means for calculating.

18. The apparatus of claim 17 further comprising means for invalidating speculatively decoded instruction lengths coupled to said means for selecting.

19. The apparatus of claim 18 wherein said means for storing comprises entries to store 32 instruction bytes each.

20. The apparatus of claim 19 further comprising means for selecting 16 bytes of said 32 instruction bytes.

21. The apparatus of claim 20 wherein said means for speculatively decoding a plurality of instruction lengths comprises a means for decoding four bytes of said subset of instruction bytes.

* * * * *

UNITED STATES PATENT AND TRADEMARK OFFICE
CERTIFICATE OF CORRECTION

PATENT NO. : 7,305,542 B2 Page 1 of 1
APPLICATION NO. : 10/180389
DATED : December 4, 2007
INVENTOR(S) : Madduri It is certified that error appears in the above-identified patent and that said Letters Patent is hereby corrected as shown below:

Column 6, line 5, in Claim 9, after "corresponding" delete "the".

Signed and Sealed this

Thirteenth Day of May, 2008

JON W. DUDAS
*Director of the United States Patent and Trademark Office*